March 15, 1949.  J. W. BANCROFT  2,464,548
MOTOR CONTROL SYSTEM
Filed Feb. 21, 1944
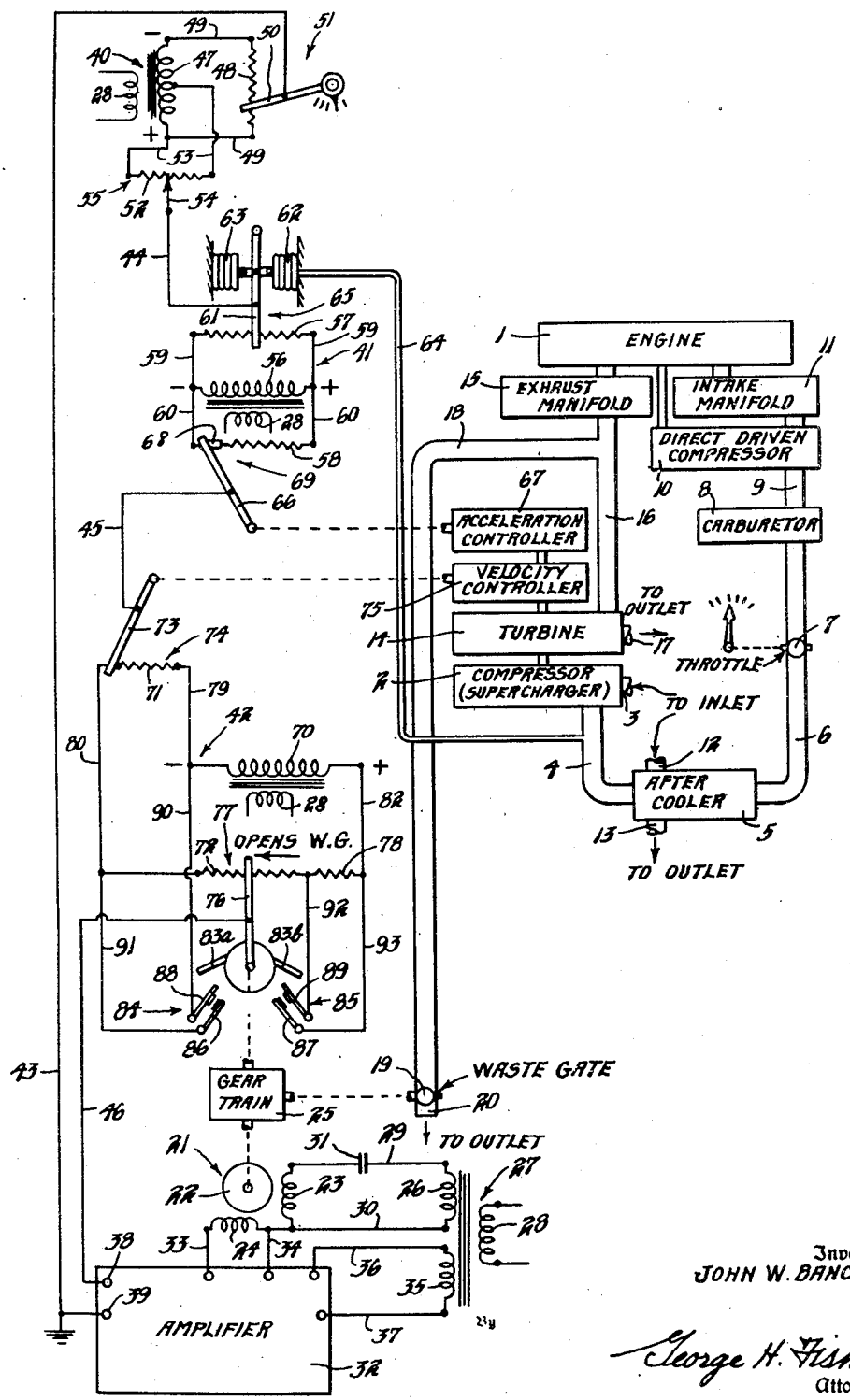
Inventor
JOHN W. BANCROFT
By George H. Fisher
Attorney

UNITED STATES PATENT OFFICE 2,464,548

MOTOR CONTROL SYSTEM

John W. Bancroft, Minneapolis, Minn., assignor to Minneapolis-Honeywell Regulator Company, Minneapolis, Minn., a corporation of Delaware Application February 21, 1944, Serial No. 523,206

11 Claims. (Cl. 230—5)

This invention relates to improvements in motor control systems.

In the use of reversible electric motors for positioning an oppositely adjustable element some means is required for limiting the movements in the opposite directions and at the extremes of such movements. For this purpose it is customary to provide limit switches arranged to be actuated when the motor, or a device driven thereby, reaches the desired limits of movement in each direction, such switches when actuated opening the appropriate circuit to one or the other of the field windings of the motor to stop the same.

However, in some control systems it is undesirable to open the field winding circuits to the motor since in doing so control over the motor is lost and further operation is impossible until the switch is reset. As an example of a system of this nature may be cited an electronic motor control wherein one field winding of a reversible motor is continuously excited while the other field winding is energized by an electronic amplifier with currents which lead or lag the current in the first winding by a phase angle such as to cause the motor armature to rotate in either direction as desired. Obviously the opening of the motor field winding circuits in systems of this nature would prevent the motor from being reversed after reaching either limiting position and would therefore be impracticable. As a result it has been customary to provide limit stops which simply stall the motor when it reaches limiting position in either direction of rotation, but such stalling is found to cause unnecessary wear and deterioration, particularly where the motor is of any size. Inasmuch as electronic motor control systems have numerous advantages and applications it is evident that an effective limiting system is a practical necessity.

As a particular example of such systems I have herein shown my invention as applied to an electronic control system, for adjusting and maintaining the intake manifold pressure of an aircraft or other internal combustion engine, of the type disclosed in the co-pending application of Hubert T. Sparrow, Serial No. 476,797, filed February 22, 1943. In this system, the engine is equipped with a compressor for supplying the air for combustion and a turbine for driving the compressor, the two units being commonly known as a turbo-supercharger. The turbine is operated by exhaust gases from the engine and the volume of such gases supplied the turbine, and hence the speed of the turbo-supercharger and the pressure at the discharge side of the compressor, is varied by a waste gate which diverts more or less of the gases to atmosphere. For positioning the waste gate a reversible electric motor is employed and is controlled and energized by an electronic amplifier to which signal potentials are supplied by an electrical bridge circuit. The bridge circuit or network is provided with controls responsive to pressure in the intake manifold or induction system of the engine, to the speed and rate of acceleration of the turbine, and with a manual selector control, all of which determine the electrical characteristics of the network to the end that the amplifier is energized with signal potentials of one phase or another according to conditions. The amplifier in response to signal potentials of one phase will energize the motor to rotate in one direction and close the waste gate, and will reverse the direction of rotation to open the waste gate when the input signal potential is of opposite phase.

It is the primary object of my invention to provide a system for controlling a reversible motor means of this nature for limiting the operation of a motor at desired points or extremes of its opposite rotary movements to the point that the motor will be prevented from stalling, but in such manner as to retain full control over the motor at all times. In accordance with this object I provide in connection with the electronic amplifier, and its controlling electrical bridge or network, means actuated by the motor, or responsive thereto, for introducing signal potentials at the amplifier input, when the motor reaches a limiting condition at the extreme of its rotary movement in either direction, such as to cause the motor to reverse and start an opposite rotary movement. This movement in turn is limited by the deactuation of such means to again reverse the motor, and so on continuously as long as the motor remains at such limiting position. There occurs then a minor oscillating movement of the motor, or hunting as it is generally termed, which will prevent the motor from stalling, and requires no limit stops to cause wear or other undesirable effects on the part or element positioned by the motor.

Another object is to provide means for inducing a hunting condition in the system as described and which is simple and positive of operation and flexible in adaption to many kinds of amplifiers, networks or bridges and motors.

These and other more detailed and specific objects will be disclosed in the course of the following specification, reference being had to the accompanying drawings, in which the single figure of the drawing represents schematically a complete turbo-supercharger control system to which my invention is applied.

Referring now more particularly to the drawings I have shown therein in schematic form an internal combustion engine 1, which may be the engine of an aircraft. Air for supporting combustion in the engine is supplied by a compressor 2 receiving air from the atmosphere at an intake 3 and delivering the air under compression through a duct 4, an after cooler 5, a duct 6 in which a throttle 7 is located, a carburetor 8, a duct 9, a compressor 10 and an intake manifold 11 to the engine.

The after cooler 5 removes the heat of compression from the air discharged by compressor 2, when this is required, and for this purpose receives fresh air at intake 12, passes it in heat exchanging relation to the air in the induction system and delivers the air as waste from the outlet 13.

The compressor 10 is, as indicated, directly driven from the engine and serves not only to compress the air but to distribute it evenly to all cylinders of the engine. This direct driven compressor 10 is accordingly usually built as a part of the intake manifold 11 but is shown separately herein for convenience.

The compressor 2 is driven by a turbine 14 and these units together are commonly known as a turbo-supercharger. The turbine 14 is powered by exhaust gases from the engine, receiving the gases from an exhaust manifold 15 through a duct 16 and discharging the gases through an outlet 17. A by-pass duct 18 is shown as leading off from the duct 16 and a damper or waste gate 19 is provided in this duct 18 to control the flow of exhaust gases through another outlet 20.

The resistance to flow of the exhaust gases through outlet 20 will of course be less than the resistance through the turbine 14 to the outlet 17 and hence as the waste gate 19 is opened the gases will in largest part discharge without operating the turbine. As the waste gate is then progressively closed, more and more of the total volume of exhaust gases will be diverted through the turbine to increase its speed and that of the compressor 2, and increase the compression ratio of the latter. The position of the waste gate 19 is thus seen to control the speed of the turbo-supercharger and the pressure of the air supplied thereby to the engine.

The waste gate 19 is positioned by a reversible split phase alternating current motor 21 having an armature 22 and two field winding 23 and 24 spaced ninety electrical degrees apart. The motor is connected as shown through a gear train 25 to the waste gate. One winding 23 of the motor 21 is continuously energized by a secondary winding 26 of a transformer 27, the primary winding 28 of which is connected to a suitable source of alternating current. Conductors 29 and 30 connect the respective windings 23 and 26 and in conductor 29 a condenser 31 is interposed the purpose of which is to introduce a phase shift such that the current in the motor field winding 23 is approximately in phase with the voltage across the transformer winding 26 instead of being displaced ninety electrical degrees therefrom, as would normally be the case due to the inductance of the field winding.

The other field winding 24 of the motor 21 is energized by an electronic amplifier 32 to which the winding is connected by conductors 33 and 34. The amplifier 32 is powered by another secondary winding 35 on the transformer 27 connected by conductors 36 and 37 to the amplifier.

This amplifier may be of any suitable type such as that disclosed in the co-pending application of Albert P. Upton, Serial No. 437,561, filed April 3, 1942, now matured into Patent No. 2,423,534 of July 8, 1947, and has a pair of input terminals 38 and 39. The characteristics of the amplifier is such that it will supply an alternating current potential to motor field winding 24 of a phase angle equal to or opposite to that of a current of predetermined phase according to the phase of an alternating signal potential applied across the input terminals 38 and 39. By reason of the constants of the amplifier and the condenser 31, the phase of this current through the field winding 24 will lead the current flowing in the other field winding 23 by ninety electrical degrees if the signal applied to the amplifier is of one phase and will lag the current in winding 24 by a similar angle if the exciting signal is of opposite phase.

The motor 21 will rotate in one direction when the current in its field winding 24 leads that in its continuously excited field winding 23 and will reverse and rotate in the opposite direction when the current lags. The phase of the signal potential applied to the input terminals 38 and 39 of the amplifier 32 is thus seen to control the direction of rotation of the motor 21 and the position of the waste gate 19.

The signal potential applied to the amplifier 32 is determined by the electrical conditions in a compound electrical network here shown as comprising three electrical networks 40, 41 and 42 connected in series and across the amplifier input terminals 38 and 39. The series network circuit may be traced from the amplifier input terminal 39 through a conductor 43, the network 40, a conductor 44, the network 41, a conductor 45, the network 42 and a conductor 46 to the amplifier input terminal 38.

The network 40 comprises a transformer secondary winding 47 across which is connected a slidewire resistance 48 by conductors 49. A slider 50 cooperates with the resistance 48 and the conductor 43 is connected to this slider. The resistance 48 and slider 50 together form a control point adjuster 51 which is manually adjustable as indicated. The secondary winding 47 is center tapped and a slidewire resistance 52 is connected between this center tap and the lower terminal of the winding by means of conductors 53. A slider 54 cooperates with the resistance 52 and together therewith forms a calibrating potentiometer 55. The conductor 44 is connected to slider 54.

The second network 41 also includes a secondary winding 56 and across the terminals thereof are connected a pair of slidewire resistances 57 and 58 by conductors 59 and 60, respectively. Cooperating with the resistance 57 is a slider 61 to which the conductor 44 is shown connected and which is positioned along the resistance in accordance with the absolute pressure of the air at some suitable point between the compressor 2 and the engine 1. For this purpose two bellows 62 and 63 are arranged with their free ends connected to the slider and the bellows 62 is interiorly connected to the duct 4 by a conduit 64. The bellows 63 is evacuated and compensates the control for variations in ambient air pressures in a well known manner. The slider 61 and resistance 57 together form a main control potentiometer 65 and as here shown it is obvious that increasing pressure of the air in the induction system of the engine will cause the slider to move to the left along the resistance, while decreasing pressure will reverse this direction of movement.

A slider 66 cooperates with the resistance 58 and is positioned therealong by an acceleration controller 67 of any suitable kind operated by the turbine 14. Acceleration of the turbine beyond a safe rate will move the slider 66 along the resistance toward the right, and the resistance may have a dead spot 68 so that minor accelerations will not vary the resistance in the circuit. The slider 66 and resistance 58 together form an acceleration compensating controller 69 and the conductor 45 is connected to this slider.

The third network 42 includes a secondary winding 70 and a pair of slidewire resistances 71 and 72. All of the secondary windings 47, 56 and 70 may be located on the transformer 27 or may be otherwise arranged so that the alternating currents supplied the respective networks 40, 41, and 42 will have a definite phase relationship to that supplied the amplifier 32. To illustrate that the secondary windings 47, 56, and 70 all may be located on transformer 27 and to avoid confusing the drawing by conductors running from secondaries grouped together at one place, the secondaries have been shown in association with the portions of the apparatus energized by them and the primary winding 28 has been shown in inductive relation with each secondary winding.

A slider 73 cooperates with the resistance 71 forming therewith a velocity compensating controller 74. The slider 73 is connected to the conductor 45 and is positioned by a velocity controller unit 75 of any suitable form connected to the turbine 14 and operative to position the slider in accordance with the velocity of the turbine. Actually the unit 75 responds only to an overspeed of the turbine beyond a maximum safe value and as here shown the slider 73 moves toward the right along resistance 71 when such overspeed conditions occur.

A slider 76 cooperates with the slidewire resistance 72 and is positioned therealong by a connection as shown to the gear train 25 so that this slider will be positioned in accordance with movements of the waste gate 19 by the motor 21. The slider 76 and resistance 72 together form a rebalancing or follow-up potentiometer 77 and the conductor 46 is connected to the slider. As here shown, and as indicated by the legend in the drawing, the slider 76 moves toward the left along the resistance 72 as the waste gate opens, and vice versa.

The system as thus far described is essentially identical to that disclosed in the co-pending Sparrow application hereinbefore identified.

In accordance with the present invention the network 42 is provided with my means or system for controlling the motor 21 and for this purpose the two slidewire resistances 71 and 72 are connected in series with a third fixed resistance 78 and all are connected in series across the secondary winding 70. The circuit may be traced from the left hand terminal of winding 70 through a conductor 79, the slidewire resistance 71, a conductor 80, the slidewire resistance 72, the fixed resistance 78 and a conductor 82 to the right hand terminal of the winding. The slidewire resistance 72 is thus disposed between the resistances 71 and 78 and the latter two may well be of the same value or magnitude.

The slider 76, or some part driven by the gear train 25 is provided with a projecting arm or cam members 83a and 83b, and located in the path thereof are two spaced limit switches 84—85 having the fixed contacts 86—87 and movable contacts 88—89, respectively. These switches are so located that, as the slider 76 reaches the extreme of its movement toward the left along the resistance 72 the movable contact 88 of the switch 84 will be engaged by the arm 83a and closed against the fixed contact 86 while as the slider reaches the right hand end of the resistance the arm 83b will engage the movable contact 89 of the switch 85 and urge it against the fixed contact 87. The movable contacts 88 and 89 are biased to normally stand out of contact with their respective fixed contacts 86 and 87.

The limit switch 84 is arranged when closed to shunt out the slidewire resistance 71 and the movable contact 88 of this switch is connected by a conductor 90 to the conductor 79 while the fixed contact 86 is connected by a conductor 91 to conductor 80 for this purpose. In similar fashion, the limit switch 85 is arranged when closed to shunt out the fixed resistance 78 and for this purpose the movable contact 89 is connected by a conductor 92 to the conductor 81 while the fixed contact 87 is connected by a conductor 93 to the conductor 82.

When the limit switch 84 is closed, a closed circuit may be traced from the movable contact 88 through conductor 90, conductor 79, slidewire resistance 71, conductor 80, conductor 91 to the fixed contact 86 so that the left hand terminal of slidewire resistance 72 is effectively connected directly to the left hand terminal of the secondary winding 70.

When limit switch 85 is closed a closed circuit may be traced from the movable contact 89 through conductor 92, conductor 81, fixed resistance 78, and conductor 93 to the fixed contact 87 effectively connecting the right hand terminal of the slidewire resistance 72 to the right hand terminal of secondary winding 70.

*General operation*

The operation of the system will first be briefly described without considering the operation of the limit switches 84 and 85 and with the resistances 71 and 78 in the circuit.

Considering first the network 40, it will be evident that with the sliders 50 and 54 at the positions shown, and with the potential condition existing throughout the system during a half cycle at which the polarity of the respective terminals of the winding 47 is as indicated by the legends, then the slider 50 is at approximately the same potential as the slider 54. The network 41, however, introduces a positive potential since the slider 61, being at the midpoint of resistance 57 is relatively more positive than the slider 66. In the network 42, the slider 73 is at the same potential as the left hand or negative end of resistor 72, while the slider 76 is relatively more positive than slider 73.

It is apparent then that if the respective positive and negative potentials introduced by the networks 41 and 42 are of equal magnitude, as they are assumed to be, then the effective signal potential at the terminals 38 and 39 of the amplifier 32 is nil and the system is at rest with the waste gate 19 in a certain position.

Now, should the pressure of the air reaching the carburetor 8 increase, the bellows 62 will be expanded, moving the slider 61 toward the left along the resistance 57. All other sliders remaining in the same position, the network 41 now introduces a lesser positive potential and, since the potential applied to the amplifier input terminals 38 and 39 is the vector sum of the potentials developed in the three series networks 40, 41, and 42, it will be apparent that there will now be applied to the amplifier 32 a signal potential of such polarity as to cause terminal 38 to be positive with respect to terminal 39. The amplifier responds to a signal of this polarity by energizing the field winding 24 of the motor 21 with a current of proper phase to cause the motor to run the waste gate 19 toward the open position. Such action, of course, reduces the speed of the turbine 14 and reduces the pressure of the air delivered by the compressor 2.

Such movement of the waste gate 19 is accompanied by a movement of the slider 76 toward the left along the resistance 72 and the slider thus becomes more negative with respect to the right hand terminal of secondary 70 and will reach a point at which the change in the potential difference introduced into the series circuit by the network 42 will overcome the change in the potential difference introduced by the network 41 by reason of the pressure increase, whereupon the signal potential applied to the amplifier will disappear and the motor 21 will cease rotation. The waste gate 19 will be left at a new, more nearly open position. As the pressure falls in the induction system, the slider 61 will move back toward the right and this tends to take place as slider 76 is moving to the left to rebalance the system as described above.

A decrease in pressure in the induction system will cause an opposite movement of the sliders as will be apparent, causing a signal of opposite polarity to be applied to the amplifier 32 and moving the waste gate 19 towards closed position to compensate.

To select higher or lower pressures the slider 50 may be moved along the resistance 48 to cause the network 40 to introduce a potential into the series circuit of proper polarity while the occurrence of an over acceleration or overspeeding condition in the turbine will position the sliders 66 and 73, respectively, to cause the networks 41 and 42 to introduce potentials such as to open the waste gate and counteract such tendencies. The slider 54 serves on a calibrating means, its position regulating the position of the slider 50 for a predetermined induction system pressure as will be understood. The foregoing operations are treated in detail in the Sparrow application hereinbefore referred to, and since they are not material to the proper understanding of my invention they will not be further discussed herein.

*Operation of the limit control*

The movement of the slider 76 to the extreme right and left hand extremities of the resistance 72 corresponds to the maximum closed and open positions, respectively, of the waste gate 19, as here shown, and means must be provided to limit the rotation of the motor at these extremes of its opposite movement. Previously it has been customary to provide stops for the waste gate, slider, or some associated moving part and to permit the motor to simply stall when the limits are reached, but this is undesirable for very apparent reasons, It may here be noted too that the customary limit switch arrangement, wherein one of two circuits to the field winding driving the motor beyond limiting position is opened to stop the motor, is not at all applicable to motor control systems as herein shown since there is only one field winding circuit and opening this would remove the motor from control of the amplifier.

Turning now to a consideration of the operation of my invention, it will be seen that as the motor 21 moves the waste gate 19 to full open position, the arm 83a will engage and close the switch 84. This action shunts out the resistance 71 whereupon the slider 76 is immediately made considerably more negative than it was with the resistance in circuit. Inasmuch as the signal potential driving the motor in this direction, still assuming the instantaneous polarities shown by the legends and previously referred to, was the result of the introduction into the series network circuit of a signal causing terminal 38 to be positive with respect to terminal 39, then the increasing negative polarity of slider 76 with respect to the right hand terminal of secondary 70 introduced by this closing of the limit switch 84 will overcome this "opening" signal causing the motor 21 to reverse. The limit switches 84 and 85, as will be obvious from the drawing, have no appreciable differential. In other words, only a very small movement of the actuator is necessary between the open and closed positions of these switches. Thus, as soon as the reverse movement occurs the switch 84 will be opened, causing terminal 38 to again be positive with regard to terminal 39, and causing the motor to again reverse itself and again close the switch. So long as the remainder of the system calls for the waste gate to stand at fully opened position, the motor will continuously reverse causing an oscillation through a minor range, or hunting, about this limit position. The continuous minor movement is far easier on the motor than stalling it as has been previously the custom. Due to the very narrow differential of switch 84, the oscillation of the motor will be so slight as not to appreciably affect the position of the waste gate.

When the waste gate 19 reaches maximum closed position, the slider 76 will be moved far to the right along the resistance 72 and the arm 83b will then close the limit switch 85. This action shunts out the resistance 78 whereupon the slider 76 is immediately made more positive than heretofore.

The resulting sharp increase in the positive direction of the polarity of slider 76 introduced into the series circuit by the network 42 overcomes the negative potential difference between terminals 38 and 39 which is being supplied by the network to close the waste gate, with the result that the amplifier reverses the motor and starts the waste gate back toward open position. The switch 84 is then opened and the same oscillation or hunting occurs about this limiting position.

Essentially my invention provides a means or system for introducing a periodic overbalancing or overriding potential opposite to that driving the motor toward or beyond its limiting position to cause a hunting action about such limiting position. Obviously, the specific circuit arrangement will then vary according to the characteristics of the control system as a whole and the limit switches may either shunt out elements of the system, or insert other elements into the system to bring about the desired result. The specific circuit herein disclosed is, therefore, to be considered as for exemplification only.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a control system for a reversible electric motor means, a controlling variable impedance, a follow-up variable impedance positioned by said motor means, an electronic amplifier connected to said motor means for controlling the extent and direction of energization of said motor means, connections between said controlling and follow-up impedances and said amplifier effective to cause said amplifier to control the direction and extent of operation of said motor means in accordance with the relative values of said variable impedances, and means operative upon said motor means reaching a predetermined position to affect said connections so as to cause said motor means to reverse under the continual control of said controlling and follow-up impedances until said motor means has moved a relatively small distance away from said predetermined position.

2. In a control system for a reversible electric motor means, a normally balanced impedance network comprising a controlling variable impedance and a follow-up impedance positioned by said motor means, an electronic amplifier connected to said motor means for controlling the extent and direction of energization of said motor means, connections between said impedance network and said amplifier effective to cause said amplifier to control the direction and extent of operation of said motor means in accordance with the relative values of said variable impedances, and means operative upon said motor means reaching a predetermined position to shift the balance point of said network in such a manner as to cause said motor means to reverse until said motor means has moved a relatively small distance away from said predetermined position.

3. In a control system for a reversible electric motor means, a normally balanced impedance network comprising a controlling variable impedance and a follow-up impedance positioned by said motor means, an electronic amplifier connected to said motor means for controlling the extent and direction of energization of said motor means, connections between said impedance network and said amplifier effective to cause said amplifier to control the direction and extent of operation of said motor means in accordance with the relative values of said variable impedances, a switch movable from a first to a second circuit controlling position upon said motor means reaching a predetermined position, and means operative upon said switch being moved to said second circuit controlling position to cause the balance point of said network to be shifted in such a manner as to cause said motor means to oscillate about said position under the continual control of said controlling and follow-up impedances as said switch is moved back and forth between said first and second circuit controlling positions.

4. In a control system for a reversible electric motor means, a controlling variable impedance, a follow-up variable impedance positioned by said motor means, an electronic amplifier connected to said motor means for controlling the extent and direction of energization of said motor means, connections between said controlling and follow up impedances and said amplifier effective to cause said amplifier to control the direction and extent of operation of said motor means in accordance with the relative values of said variable impedances, and means operative upon said motor means reaching either of two opposite limiting positions to affect said connections so as to cause said motor means to reverse under the continual control of said controlling and follow-up impedances until said motor means has moved a relatively small distance away from said predetermined position.

5. In a control system for a reversible electric motor means, a main controller, a follow-up controller positioned by said motor means, normally balanced electrical bridge means including said main and follow-up controllers for controlling said motor means to cause the latter to assume a different predetermined position for each position of said main controller, means associated with said normally balanced bridge means for affecting the balanced relation between said main and follow-up controllers at which said normally balanced bridge means is balanced, and means operative each time that said motor means reaches a predetermined position to render said last named means effective until said motor means has moved a slight distance away from said predetermined position so that as long as said normally balanced bridge means calls for said motor means normally being in said predetermined position, said motor means oscillates about said predetermined position.

6. In a control device for a turbine driven supercharger, a reversible electric motor means, a device for actuating a waste gate to be positioned thereby, said waste gate adapted to regulate the speed of the supercharger, connecting means between said motor means and said device, a main controller, balanced electrical bridge means including said main controller for controlling the energization of said motor means to cause the latter to variably position said waste gate in accordance with the balance of said bridge means and said main controller, and means operative each time that said motor means reaches either of two predetermined positions corresponding to desired limiting positions of the normal range of movement of said device to periodically alter the balance of said bridge means and reverse the energization of said motor means to cause the latter to oscillate about said predetermined position with an amplitude sufficiently slight that the oscillation is not appreciably transmitted through said connecting means to said device.

7. In combination, a motor, control means comprising resistance means and adjusting means therefor, operative connections between said motor and adjusting means for positioning the latter by the former, the resistance means adapted to be connected into a balanceable resistance network for reversibly controlling the operation of said motor, switching means connected to said motor, and operated by said motor upon the latter reaching the end of its normal range of movement, and means including connections between said switching means and said resistance means abruptly changing the effective value of said resistance means in said network to reverse the electrical balance of said network and the operation of said motor when said switch means has been operated by said motor.

8. In combination, a motor, control means comprising a potentiometer having relatively movable resistance and contact members, operative connections between said motor and one of said members for causing said motor to move said one member with respect to the other, a resistor connected to said resistance member, said resistor and resistance member being adapted to be connected into a balanceable resistance network for reversibly controlling the operation of said motor, switching means connected to said motor and actuated by said motor upon the latter reaching the end of its normal range of movement, and means including connections between said switching means and said resistor rendering said resistor ineffective in said network to reverse the balance of said network and the operation of said motor when said switching means has been actuated by said motor.

9. In combination, a reversible electric motor, a balanceable resistance network, said network comprising an adjustable resistor, and a pair of resistors connected on either end of said adjustable resistor, means connecting said network to said motor to reversibly control the latter in accordance with the electrical balance of the former, a pair of switch means which are operative when said motor has been operated to one or the other of its end positions, and means including said switch means operative when said motor has reached one end position for shorting out that resistor which will unbalance said network in the direction opposite the unbalance causing said motor to move to said one extreme position.

10. In a control system for a reversible electric motor means, a controlling variable impedance, a follow up variable impedance positioned by said motor means, means operatively connecting said controlling and follow up variable impedances together to form part of a balanceable impedance network, means connecting said motor means to said network so that said network will reversibly control the operation of said motor in accordance with the electrical balance of said network, further impedance means connected in said network, and means including said further impedance means for reversing the electrical balance of said network and the direction of rotation of said motor means when said motor means has moved in a given direction beyond a predetermined position until said motor means has moved a relatively small distance away from said predetermined position.

11. In combination, a reversible electric motor, a balanced resistance network, electronic amplifier means having input terminals connected to said network to form a complex electrical circuit and output terminals connected to said motor to reversibly control the latter, said amplifier having an output voltage which is reversible in phase in accordance with the direction of unbalance of said network, resistance means, switch means operated by said motor means when said motor means reaches an end position, means interconnecting said resistance means and a switch means, means connecting said resistance means in said electrical circuit, and means including said switch means when operative and said resistance means for reversing the phase of the output voltage of said amplifier when said output voltage has positioned said motor beyond a predetermined position while maintaining said network continuously connected to said input terminals.

JOHN W. BANCROFT.

REFERENCES CITED

The following references are of record in the file of this patent:

UNITED STATES PATENTS

| Number | Name | Date |
|---|---|---|
| 1,557,793 | Berger | Oct. 20, 1925 |
| 1,982,350 | Mittag | Nov. 27, 1934 |
| 2,184,576 | Beyerle | Dec. 26, 1939 |
| 2,226,510 | Grant | Dec. 24, 1940 |
| 2,359,400 | White | Oct. 3, 1944 |
| 2,376,142 | Hoffman et al. | May 15, 1945 |
| 2,376,143 | Edwards et al. | May 15, 1945 |
| 2,389,939 | Sparrow | Nov. 27, 1945 |